United States Patent
Anderson et al.

(10) Patent No.: US 6,178,391 B1
(45) Date of Patent: Jan. 23, 2001

(54) METHOD FOR PARTITIONING AN INTEGRATED GROUND AIR TRAFFIC MANAGEMENT COMMUNICATIONS SYSTEM

(75) Inventors: A. Jackson Anderson; Dennis L. Shaver, both of Richardson; Lawrence J. Simon; Richard C. Sunlin, both of Plano, all of TX (US)

(73) Assignee: Rockwell Collins, Inc., Cedar Rapids, IA (US)

( * ) Notice: Under 35 U.S.C. 154(b), the term of this patent shall be extended for 0 days.

(21) Appl. No.: 09/060,489

(22) Filed: Apr. 15, 1998

(51) Int. Cl.$^7$ ........................................ G06F 17/50
(52) U.S. Cl. .......................... 703/1; 703/8; 342/36; 342/37
(58) Field of Search ..................... 395/500.34, 500.29; 342/36, 37; 703/1, 8

(56) References Cited

U.S. PATENT DOCUMENTS 5,459,469 * 10/1995 Schuchman et al. ................ 342/36
5,798,726 * 8/1998 Schuchman et al. ................ 342/36

OTHER PUBLICATIONS

Inal, R., "Modular Specification of Real–Time Systems", Proceedings of the Sixth Euromicro Workshop on Real–Time Systems, pp. 16–21, Jun. 1994.*

Feighery et al., "The Aeornautical Telecommunications Network (ATN) Testbed", 15th AIAA/IEEE Digital Avionics Systems Conference, vol. 117–122, Oct. 1996.*

Galati et al., "Study of an Integrated Communication, Navigation and Surveillance Satellite System for Air Traffic Management", Proceedings of the CIE International Conference on Radar, pp. 238–241, Oct. 1996.*

Gimenes et al., "How High Integrity Systems Can Benefit from Process–Centered Software Engineering Environments", IEE Colloquium on Software in Air Traffic Control Systems—The Future, pp. 10/1–10/4, 1992.*

Olson, R. R., "The Airborne Open System Interconnection Data Link Test Facility", Proceedings of the IEEE/AIAA 11th Digital Avionics Systems Conference, pp. 509–513, Oct. 1992.*

Shuvaev et al., "Preoperational Testing of Data Link–Based Air Traffic Management Systems in Magadan, Far East Russia", IEEE 1996 Position Location and Navigation Symposium, pp. 184–187, Apr. 1996.*

Vincent, J.W., "Air Traffic Services Safety and Interoperability: Certification of Ground/Air Systems", IEE Certification on Ground/Air Systems Seminar, pp. 1/1–1/16, Feb. 1998.*

Whyman T., "Issues Concerning the Certification/Approval of the Aeronatical Telecommincations Network", IEE Certification on Ground/Air Systems Seminar, pp. 1/1–1/8, Feb. 1998.*

Bradley et al., "Integrated Modular Avionics and Certification—An IMA Design Team's View", IEE Certification of Ground/Air Systems Seminar, pp. 7/1–7/7, Feb. 1998.*

(List continued on next page.)

Primary Examiner—Kevin J. Teska
Assistant Examiner—Douglas W. Sergent
(74) Attorney, Agent, or Firm—Nathan O. Jensen; Kyle Eppele; James P. O'Shaughnessy

(57) ABSTRACT

A method for designing an aircraft to ground communications system identifies a plurality of unique functions in the communications system. The components, hardware and software, necessary to implement each of the plurality of unique functions are isolated such that the components for implementing a specific function are partitioned to allow independent testing and certification of the hardware and software components for each unique function.

2 Claims, 1 Drawing Sheet

OTHER PUBLICATIONS

Audsley et al., "THe Role of Timing Analysis in the Certification of IMA Systems", IEE Certificaation of Ground/Air Systems Seminar, pp. 6/1–6/6, Feb. 1998.*

Prisaznuk, P. J., "Integrated Modular Avionics", Proc IEEE 1993 National Aerospace and Electronics Conf. vol. 1, pp. 39–45. May 1992.*

Bluff, R. J., "Integrated Modular Avionics: System Modelling", Microprocessors and Microsystems, vol. 23, Issue 7, pp. 435–448, Dec. 1999.*

Portwood et al., Current Government and Indsutry Developments in the Area of System Safety Assessment, Proc. 17th Digital Avionics Systems Conf. vol.1, pp. B31–1–6, Nov. 1998.*

* cited by examiner

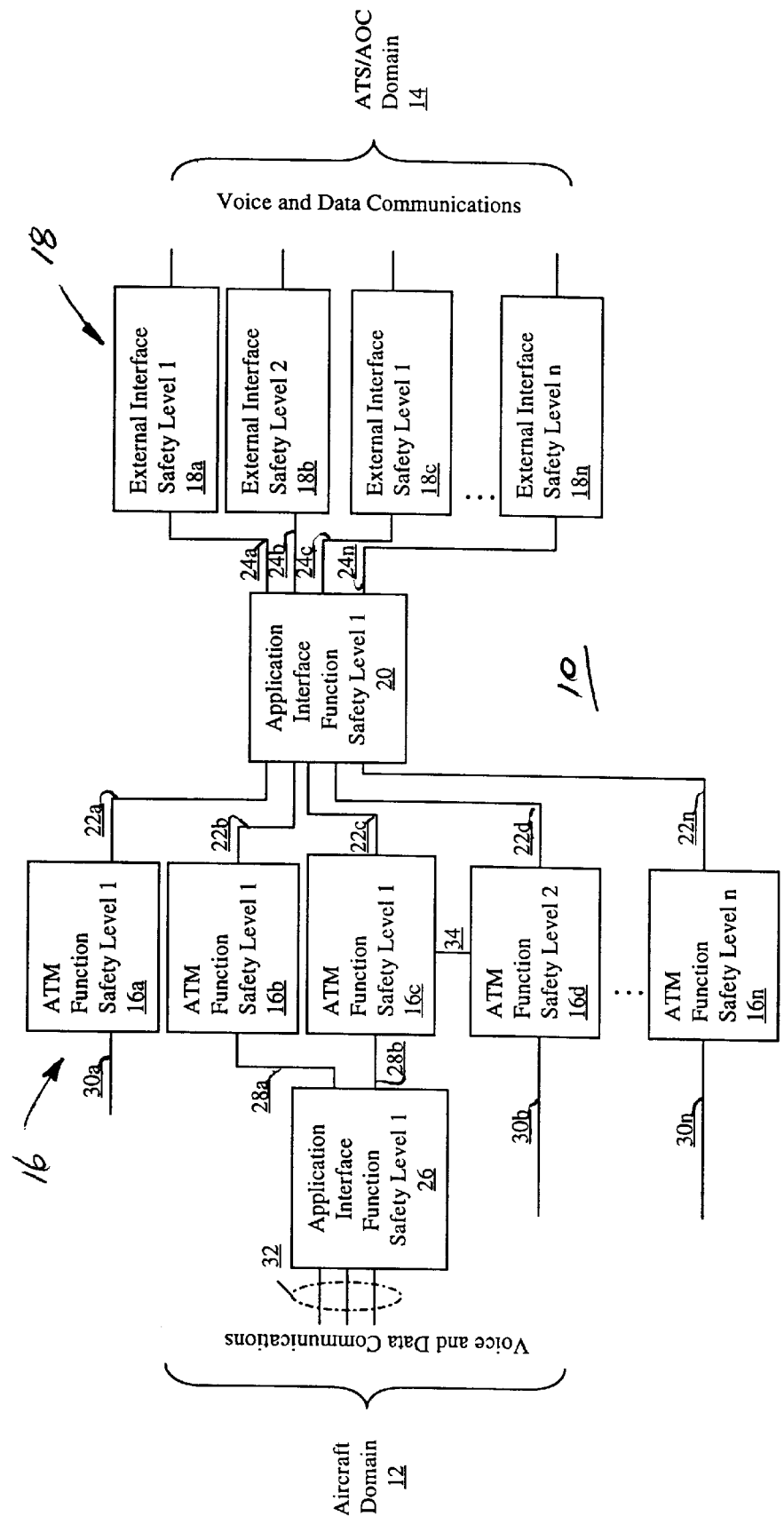

METHOD FOR PARTITIONING AN INTEGRATED GROUND AIR TRAFFIC MANAGEMENT COMMUNICATIONS SYSTEM

BACKGROUND OF THE INVENTION

Aeronautical communications for air traffic control/air traffic management (ATM) will depend on datalink communications for flight safety critical information. Growth of air traffic and the limited capabilities of voice communications result in safety issues that limit the number of aircraft that can be controlled by existing ATM systems. Both industry and aviation officials recognize the potentials of future datalink communications, however, certification of each of the systems, ground and aircraft, are very complex, variable and costly.

Certification and system testing against procurement specifications may vary based upon specifications established by each country over which an aircraft flies during the course of a flight. Each country's government agency responsible for certification may establish standards in each country for a total ground and airborne system, and in the event of a change in any one component of the system, recertification of the entire system may be required. Recertification of the entire system is costly and time consuming. In many cases, system components may be integrated to form a custom system for a user; however, the entire system must still be certified.

A need has thus arisen for an air traffic communications system that is designed to allow for independent component certification, thereby simplifying system certification. A need has further arisen for a system design criteria for partitioning of the functions of a system to permit elements of the design for one geographical location to be applied to other locations with a minimum of retest and validation of the system.

SUMMARY OF THE INVENTION

A method for designing an aircraft to ground communications system includes identifying a plurality of unique functions in the communications system. The components, hardware and software, necessary to implement each of the plurality of unique functions are isolated such that the components for implementing a specific function are partitioned to allow independent testing and certification of the hardware and software components for each unique function.

BRIEF DESCRIPTION OF THE DRAWINGS

For a more complete understanding of the present invention and for further advantages thereof, reference is now made to the following Description of the Preferred Embodiments taken in conjunction with the accompanying Drawing which is a block diagram of a communications system designed in accordance with the present invention.

DETAILED DESCRIPTION OF THE PREFERRED EMBODIMENTS

Referring to the FIGURE, a block diagram of a ground air traffic management communications system designed in accordance with the present invention is illustrated. System 10 is utilized for providing communication between an aircraft domain 12 and a ground, air traffic services/airline operational communications (ATS/AOC) domain 14. System 10 provides for both voice and data communications between aircraft domain 12 and ground domain 14.

In accordance with the present invention, air traffic management (ATM) functions are identified within system 10. These functions are isolated and partitioned within system 10 to allow for pre-engineered, certifiable components of system 10. Partitioning of the components of system 10 allows for certification to be accomplished on a function by function basis so that components of the system can be independently tested and certified without regard to other components in system 10 which have been previously certified, thereby allowing minimum retesting and validation of the overall system when fewer than all components are replaced or upgraded. System 10 is based upon a standard set of components, standard interfaces, and a standard architecture to make specification, analysis, and certification of system 10 faster and less costly.

In accordance with the design criteria of the present method, air traffic management functions are partitioned based upon several criteria. These functions are identified in the FIGURE generally by reference numeral 16, and specifically by reference numerals 16a, 16b, 16c, and 16d through 16n. The number of functions shown in the FIGURE is for illustrative purposes only, it being understood that multiple ATM functions are identifiable in accordance with the present invention within system 10.

Functions 16 are partitioned based upon, for example, defined isolation; safety level per functional hazard assessment; and testing ability to verify that there is minimal impact in the system 10 when components are changed. ATM functions include, for example, but are not limited to:

ADS-A; Automatic Dependent Surveillance-A

CPDLC (TWDL): Controller to Pilot Data Link Communications (Two Way Data Link)

Voice

Weather Data

Mode S

VDL: Very High Frequency (VHF) Datalink

HFDL: High Frequency Datalink

Satcom Datalink: Satellite Communications Datalink

ADS-B: Automatic Dependent Surveillance-Broadcast

Ground Surface Traffic

Direct Hardwired Ground Interface to Aircraft (chock position)

Maintenance

Legal Recording

Integrity Monitor

Switching

Control

Interconnect

Transmission

System 10 further includes a plurality of external interfaces, generally identified by reference numeral 18, and are specifically identified by reference numerals 18a, 18b, and 18c through 18n, for interfacing system 10 to ground domain 14 components. Interfaces 18 are also partitioned for independent testing and certification. ATM functions 16 are connected to external interfaces 18 via an application interface function 20. ATM functions 16 are connected to interface function 20 through internal interface communication paths 22a, 22b, 22c, and 22d through 22n. Application interface 20 is connected to external interfaces 18 through external interface communication paths 24a, 24b, and 24c through 24n. ATM functions 16 are connected to an application interface 26 for receiving voice and data communication from aircraft. The FIGURE illustrates two ATM functions, 16b and 16c, being connected through internal interface communication paths 28a and 28b to application interface 26. ATM functions 16 may also be directly interfaced to aircraft domain 12 via external interface communication paths 30a and 30b through 30n. Application interface 26 interfaces via external interface communication paths 32 to aircraft domain 14. Application interfaces 20 and 26 are also partitioned for testing and certification purposes. Interfaces 18, 20, and 26 provide for an open system architecture to achieve documentation and control of configuration of components within system 10, and are partitioned to create a minimum impact on the overall testing of system 10.

The components, hardware and software, for each ATM function 16, are isolated in accordance with the method of the present invention resulting in the ability to independently test and certify the components for implementing a specific ATM function. In order to effectively isolate the components, their interfaces are precisely defined and repeatable test stimuli are defined to generate predictable test results to validate that the components or the components' replacements meet the requirements. Functions 16 may provide communication directly to the aircraft domain, or through application interface 26. Additionally, functions 16 may be linked together such as functions 16c and 16d via an interval interface communications path 34, such that the components of functions 16c and 16d can be interrelated and linked for testing and certification.

It therefore can be seen that the present invention provides for a partitioned, certifiable ATM communications system having the capability of independent testing and certification of components thereby eliminating the need for complete system certification in the event of changes made to such system components. With the present standard set of design criteria for components and standard architecture, specification, analysis and certification of systems designed in accordance with the present method are done faster with reduced cost.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A method for producing an aircraft to ground communications system comprising:

identifying a plurality of unique functions in the communications system;

isolating in the system, the hardware and software components necessary to implement each of the plurality of unique functions, such that the hardware and software components for implementing a specific unique function are partitioned to allow independent testing and certification of the hardware and software components for each unique function;

coupling all of said plurality of unique functions to a single application interface which has a safety level which at least meets all safety levels of each of said plurality of unique functions; and coupling said single application interface to a plurality of external interfaces having a plurality of safety levels associated therewith, wherein said external interfaces are partitioned to allow independent testing and certification.

2. The method of claim 1 wherein isolating is based upon a safety level associated with each of the plurality of unique functions.

* * * * *